United States Patent [19]

Fritz

[11] Patent Number: 4,523,793

[45] Date of Patent: * Jun. 18, 1985

[54] HIGH-PERFORMANCE LOW-TORQUE ANTI-FRICTION BEARING ASSEMBLY

[75] Inventor: Conrad M. Fritz, Altadena, Calif.

[73] Assignee: Keystone Engineering Company, Los Angeles, Calif.

[*] Notice: The portion of the term of this patent subsequent to Aug. 23, 1990 has been disclaimed.

[21] Appl. No.: 431,357

[22] Filed: Sep. 30, 1982

[51] Int. Cl.³ .............................................. F16C 19/10
[52] U.S. Cl. ..................................... 384/604; 384/613
[58] Field of Search ............... 308/189 R, 184 R, 198, 308/207 R, 216, 174, 227, 230, 233, 188, 201

[56] References Cited

U.S. PATENT DOCUMENTS

| | | | |
|---|---|---|---|
| 2,055,174 | 9/1936 | Baker | 308/198 X |
| 2,733,967 | 2/1956 | Jones, Jr. | 308/174 |
| 3,131,006 | 4/1964 | Anderson | 308/174 |
| 3,913,993 | 10/1975 | Ernst | 308/201 X |
| 4,223,961 | 9/1980 | Martinez | 308/227 X |
| 4,330,160 | 5/1982 | Stolz et al. | 308/189 R X |
| 4,400,042 | 8/1983 | Fritz | 308/230 X |

Primary Examiner—Stuart S. Levy
Assistant Examiner—David Werner
Attorney, Agent, or Firm—Sellers and Brace

[57] ABSTRACT

A high-performance low-torque anti-friction bearing assembly having numerous applications including dynamic support of a stabilized platform under severe operating conditions. The assembly consists of two rings provided with two pairs of raceways having respective rows of balls therebetween preferably under static preload. The balls and their raceways have a conformity factor of approximately 0.56 to 0.60 and the two rows of balls are in contact with a respective pair of raceways at converging similar contact angles of about 35 degrees. The ratio of the ball path diameter and the square root of the cross-sectional area of the bearing is at least 15. A bearing incorporating these features performs at high efficiency with minimal torque losses under both simultaneous and non-simultaneous axial, radial and moment load conditions and associated distortions.

14 Claims, 8 Drawing Figures

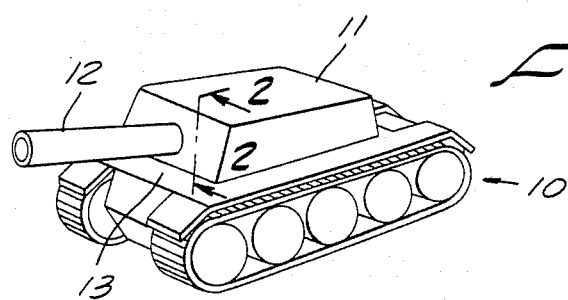
FIG. 1.
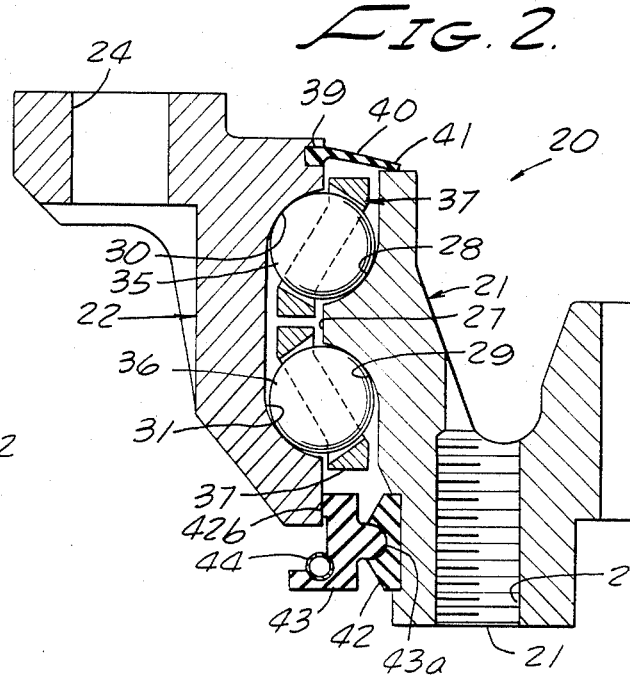
FIG. 2.
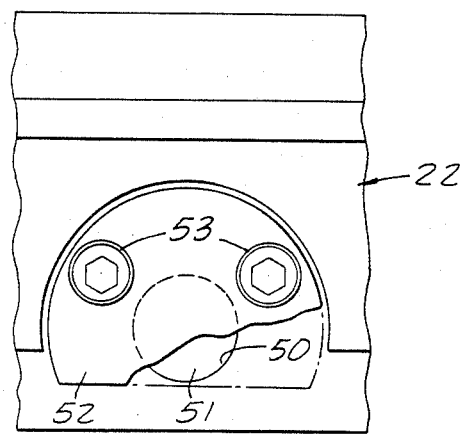
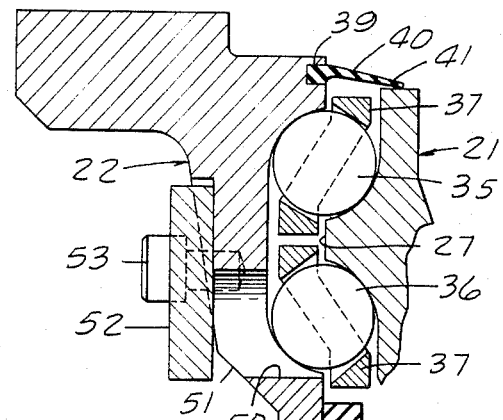
FIG. 3.
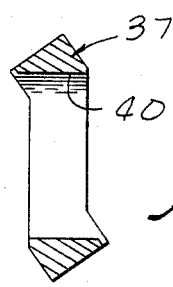
FIG. 4.
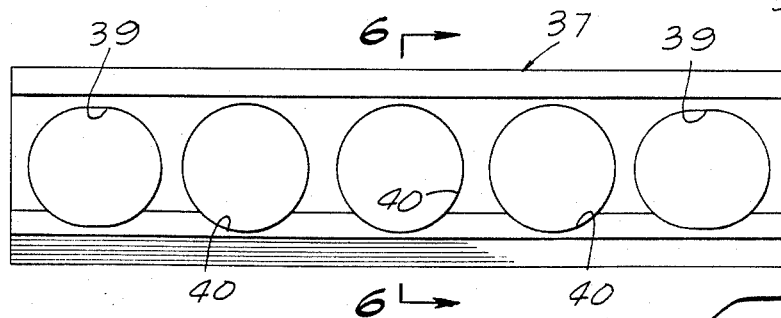
FIG. 5.
FIG. 6.

HIGH-PERFORMANCE LOW-TORQUE ANTI-FRICTION BEARING ASSEMBLY

This invention relates to anti-friction bearings, and more particularly to a simple, low-cost, heavy-duty anti-friction bearing assembly comprising two rings having two rows of balls therebetween under static preload exhibiting minimal torque losses under both simultaneous and non-simultaneous axial, radial and moment load conditions.

BACKGROUND OF THE INVENTION

Gun-supporting stabilized platforms whether mounted on aircraft, shipboard or land vehicles, subject the bearing interconnecting the rotating and non-rotating components to extremely severe operating conditions. Typically, these bearings are of large diameter and usually support heavy loads, such as several tons, and yet must exhibit minimal torque losses critically important to highly reliable stabilized performance under simultaneously occurring axial, radial and moment load forces. Designs heretofore proposed to meet these conditions customarily employ two axially spaced rows of anti-friction elements supported between pairs of raceways having their points of contact arranged in opposed converging cones. Bearings incorporating these features and utilizing double wire ring pairs of raceways, though meeting these rugged operating requirements, are complex, costly and difficult to manufacture. Representative bearings of this type are disclosed in U.S. Pat. Nos.: 3,030,158 (to Pohler); 3,361,500 (to Pohler); 3,482,892 (to Schluter); 3,517,975 (to Longren et al); 3,802,755 (to Schulter); 4,030,786 (to Schulter); and 4,126,361 (to Bottner et al). Other U.S. patents disclosing dual rows of anti-friction elements captively supported between a single pair of raceway rings include: Bright U.S. Pat. No. 1,215,474; Nelson U.S. Pat. No. 1,394,110; Wilcoxon U.S. Pat. No. 2,633,875; Fisher et al U.S. Pat. No. 3,068,480; and Rood U.S. Pat. No. 3,814,488.

No one of the foregoing prior art teachings recognizes the importance and advantages to be gained by utilizing the principles of this invention. These novel features are embodied in an anti-friction bearing having the capability of supporting a stabilized platform operable at high efficiency with minimal torque losses under both simultaneous and non-simultaneous axial, radial and moment load conditions despite unavoidable distortions under such severe conditions.

SUMMARY OF THE INVENTION

This invention provides a lightweight, high-performance, anti-friction bearing employing two rows of balls held captive under preload between a single pair of forged alloy steel rings. One of these rings is aptly called a nose ring because having a radial annular flange provided with oppositely facing arcuate raceways on its lateral sides. The other ring is aptly designated a cup ring because equipped with a wide annular groove having arcuate raceways along its opposite sidewalls diagonally opposed to a respective one of the nose ring raceways. A separate row of balls is mounted between each of these pairs of raceways, each having a normal contact angle of 35 degrees with respect to a plane normal to the axis of each row. These raceways preferably extend through an arc of substantially 90 degrees and have a radius only slightly greater than the ball radius. The ratio of this radius and the ball diameter is commonly known as the conformity ratio or constant and the value found to exhibit highly superior performance characteristics under both simultaneously and non-simultaneously occurring axial, radial and moment load conditions characterizing the prevent invention of approximately 0.56 to 0.60, or substantially higher than in prior practice. The use of this conformity factor substantially reduces torque losses with only a readily tolerated reduction in load capacity easily compensated for by the designer.

Bearings supporting stabilized platforms are customarily quite large, such as two to seven or more feet in diameter, and typically support very heavy loads customarily subjected to severe shock forces causing momentary distortions in different parts of the bearing raceway members.

One important aspect of the invention concerns criteria found highly satisfactory and expedient in determining appropriate cross-sectional area for a bearing most appropriate functionally and structurally for a particular bearing diameter. This is conveniently expressed as the disconformity capability factor having a value of at least 15 and representing the ratio of the bearing ball path diameter to the square root of the cross-sectional area of the bearing disregarding the openings for bearing mounting fasteners in accordance with customary engineering practice.

The balls of each row are preferably held separated from one another by short lengths of cage ring segments advantageously formed of semi-flexible plastic material having several important functions including the facility with which these can be assembled between the two bearing rings despite the fact that the opposed I.D. and O.D. diameters of the two bearing rings are held to a minimum gap. Each segment is provided with a plurality of openings each loosely accommodating a single ball. The two end openings are elongated circles with the minor axes extending crosswise of the segments and having a length only slightly greater than the diameter of the balls. The major axes of these openings correspond generally with the diameter of the intervening openings. It will therefore be apparent that the cage segments are supported by the two end balls in a common plane and that the remaining peripheries of all openings have point or minimal contact with the balls.

Another salient feature of this invention is that, under preload, the net torque changes are not only minimal but restricted to a narrow range, even under severe loading conditions such as those due to gunnery recoil or shock, or caused by abrupt pitching in rough seas or in travelling over shell-pocked or rough terrain. Under such conditions, the contact angles between axially related pairs of balls in the two rows change in opposite directions relative to one another and relative to the diametrically related balls on the other side of the bearing assembly, whereby the associated changes in torque losses due to load in combination with the distortions substantially nullify one another. This nullification or compensation of paired and opposed changes in torque takes place with respect to all axially related balls in each axial diametric plane.

Another important feature of the invention is the provision made for assembly and disassembly utilizing a ball-charging port opening through either the cup or nose ring and across one of the two raceways formed in this ring. This charging port is closed by a plug having its inner end contoured to lie flush with and form a part of the adjacent cup ring raceway.

Still a further feature of the invention is a novel method of assembling and preloading a double ring bearing having two rows of balls captively assembled therebetween. This is accomplished by providing multiple sets of balls of slightly differing diameters. A first set of balls is assembled between the two rings and thereafter a selected second set is assembled via the ball-charging port. If this provides a final assembly which is not preloaded to the desired value, the last assembled row of balls is removed and a second set is installed differing in diameter in a direction judged most appropriate. Experienced craftsmen seldom find it necessary to repeat this second step a third time using still another set of balls of a third size.

These and other more specific objects will appear upon reading the following specification and claims and upon considering in connection therewith the attached drawing to which they relate.

Referring now to the drawing in which a preferred embodiment of the invention is illustrated:

FIG. 1 is a perspective view of a land vehicle equipped with a stabilized gun-supporting platform and connected to the vehicle body by an illustrative embodiment of the invention two-ring double-row ball bearing assembly;

FIG. 2 is a cross sectional view through one side of the anti-friction bearing taken along line 2—2 of FIG. 1;

FIG. 3 is a cross sectional view through the ball-charging port;

FIG. 4 is a fragmentary front elevational view of the plug for the ball-charging ports in assembled position;

FIG. 5 is a side elevational view of one of the case ring segments;

FIG. 6 is a cross-sectional view taken along line 6—6 on FIG. 5;

Figure 7:
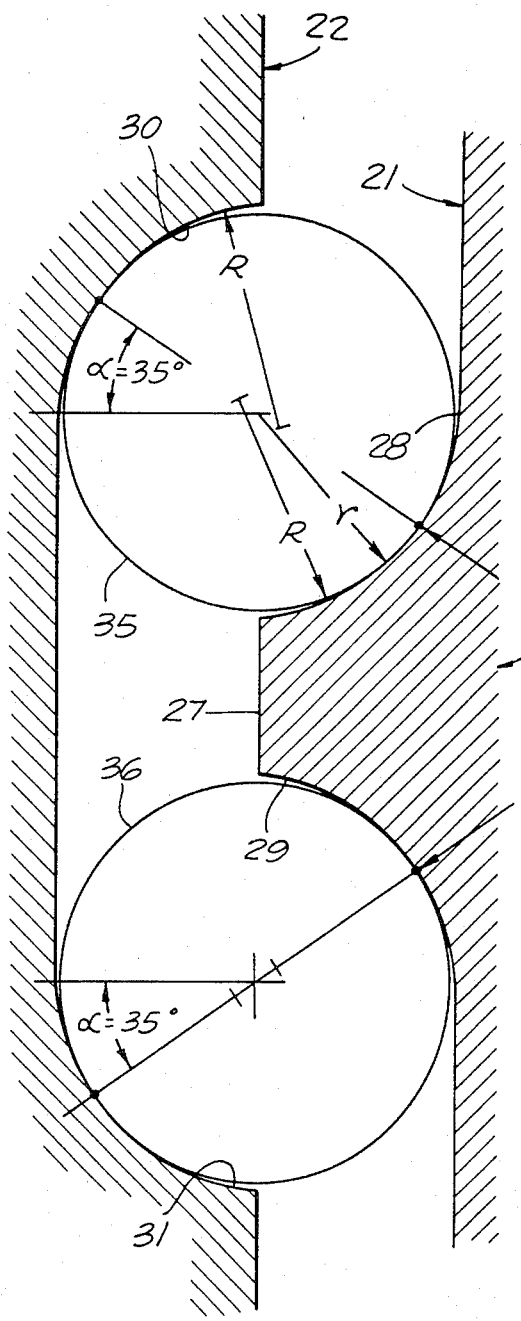
FIG. 7 is a cross-sectional view on an enlarged scale of the bearing assembly under normal static loading conditions.

Referring initially to FIG. 1, there is shown a military tank 10 equipped with a stabilized platform supporting a turret 11 on which is mounted an anti-aircraft or the like gun 12. Although not shown, it will be understood that gun 12 includes suitable known means enabling it to be elevated through a vertical arc and that it is rotatable along with turret 11 through 360 degrees about the vertical axis of the turret. This stabilized platform or turret is joined to the armored hull 13 of tank 10 by the novel anti-friction bearing assembly of this invention shown in FIG. 2 and designated generally 20.

Bearing assembly 20 comprises two forged steel alloy rings including a nose ring 21 and a cup ring 22. Nose ring 21 is rigidly secured to the vehicle hull 13 by cap screws, not shown, extended into threaded bores 23. Likewise cup ring 22 is anchored to the overlying lip of turret 11 by unshown cap screws extending upwardly through bores 24 into threaded wells in turret 11.

Nose ring 21 is so designated because its periphery is provided with an annular radial flange 27 formed on its opposite lateral faces with induction-hardened arcuate raceways 28, 29.

The diametrically opposed portions of cup ring 22 are deeply recessed and formed with induction-hardened arcuate raceways 30 and 31 facing and converging toward a respective one of raceways 28 and 29 of nose ring 21. It will be observed that the O.D. of nose 27 and the I.D. of outer ring 22 are very closely related to one another by an amount barely sufficient to permit telescopic assembly and disassembly of these two rings and thereby enabling all raceways 28, 29, 30 and 31 to extend over an arc closely approximately 90 degrees. Interposed between the two pairs of raceways of rings 21 and 22 are separate rows of balls 35 and 36. All balls are held closely spaced from one another by a series of cage ring segments 37 preferably formed of bronze or flexible non-metallic material such as low friction semi-resilient plastic such as Delrin, Nylon or the like. Each comprises an elongated strip formed in an arc having a radius corresponding to that of the ball paths and contoured to lie in a conical surface indicated in FIG. 2. The combined length of the segments for each row of balls is substantially less than the circumference of a circle passing through the centers of each row of balls so that each segment can move along the raceway a short distance independently of adjacent segments. The segments are canted at an angle of about 35 degrees to the axis of the bearing assembly and each is provided with openings 39, 40 retaining a suitable number of the balls. The two end openings 39 are preferably elongated with the minor axis extending transversely of the segments and only slightly longer than the diameter of the balls mounted therein, whereas, the major axis is somewhat longer. Hence, the arcs at the opposite ends of the major axis have a radius slightly greater than the ball radius with the result that the ball has only a single point of contact therewith.

It will be recognized that this configuration and sizing of openings 39 and 40 enables the balls in the two end openings 39 to cooperate in supporting the cage segments for the two rows of balls in separate frusto conical rings with all segments lying in a common plane. The larger diameter portions of openings 39 and entire periphery of openings 40 have only incidental point contact with the balls moving at equal speeds located therein and therefore produce no or negligible friction losses. For example, the upper end of openings 39 would normally have point contact with the ball located therein. Alternatively one end of opening 39 could have point contact with the ball therein at times if the segment and the balls therein are in motion at differential rates such that the case segment closes the gap normally existing between adjacent cage segments. Under typical operating conditions, such contact of cage segments seldom takes place due to the infrequency of simultaneously occurring severe moment loads and large arc rotary travel of the turret or other load supported by the bearing assembly. When two adjacent segments forcibly contact one another, the segments are not deflected out of their common plane because any deflection tendency is counteracted by the minor axes of the adjacent openings 39 in the segments in contact.

The cage segments 37 for the two rows of balls 35 and 36 diverge inwardly toward the bearing axis from an area radially opposite nose 27 of nose ring 21. An important assembly consideration is predicated on this design feature, it being noted from FIG. 2 that the adjacent lateral edges of the two rows of cage segments are disposed between the nose 27 of ring 21 and the juxtaposed bottom portion of cup ring 22. Likewise, the remote lateral edges of the two rows of segments 37 are held captive in the restricted radial gaps between the outer rim edges of respective pairs of raceways 28, 30 and 29, 31. This facilitates assembly and disassembly of the bearing for reasons which will be pointed out when describing the assembly operation and assures that the cage segment surfaces are generally normal to the normal contact angle.

The annular cavities occupied by the balls 35 and 36 are provided with seals to retain lubricant and to prevent the entry of foreign matter. For this purpose, cup ring 22 is provided with a channel 39 captively seating a resilient radially disposed face seal 40 having a lip 41 biased against the end edge of nose ring 21. A second resilient seal comprises a resilient ring 42 having a semicircular groove in which the complimentally shaped portion 43a of resilient sealing ring 43 fulcrums as its lip 43b maintains wiping sealing contact with the adjacent surface of the outer bearing ring 22. Garter spring 44 maintains portion 43a socketed in the semi-circular fulcrumming groove of ring 42.

Figure 8:
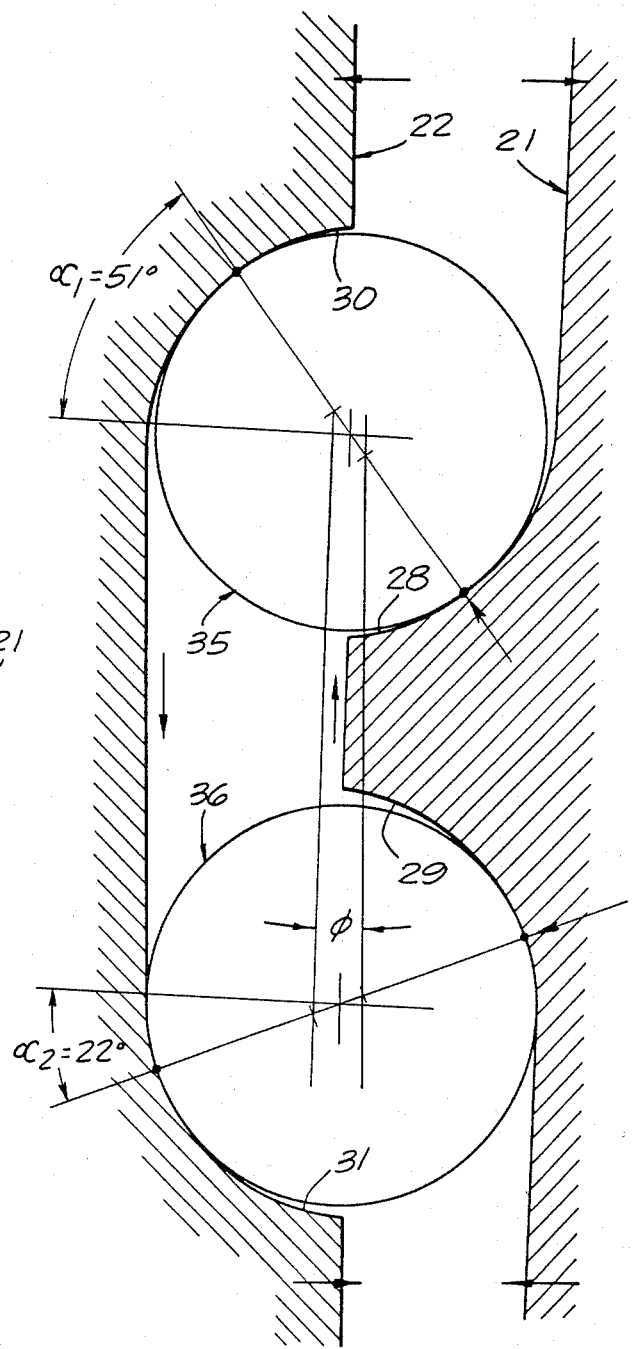
FIG. 8 is a view similar to FIG. 7 showing the bearing under severe counterclockwise moment loading conditions of the cup ring and under associated local distortion of the vehicle structure.

Referring now to FIGS. 7 and 8, important geometric aspects of the bearing design will be described. FIG. 7 shows the two rows of balls 35 and 36 assembled under static conditions whereas FIG. 8 is a similar view under counterclockwise moment loading conditions wherein the outer bearing ring 22 is tilted downwardly and to the left in a counterclockwise direction relative to the nose ring 21.

It will be noted that the radius R of all raceways is greater than the radius r of balls 35 and 36. In consequence, the bearing assembly of this invention has a conformity constant which is substantially larger than the conformity constant 0.52 conventionally employed in ball bearing assemblies. The conformity constant f is the ratio of the raceway radius to the ball diameter and is represented by the following equation:

$$f = R/D = R/2r$$

The bearing assembly incorporating the principles of this invention and providing excellent operating results found to satisfy the exacting requirements of a gun-mounting stabilized platform has a conformity factor of about 0.56 to 0.60.

The contact angle alpha between a plant through the points of contact of each row of balls with their raceways and a diametric plane normal to the bearing axis under static conditions is approximately 35°. However, under moment loading conditions the contact angle changes from this static condition but in such manner that the increase in torque or friction losses of half the balls in each row is substantially nullified or compensated for by a decrease in the torque or friction losses of the other half of the balls. For example, referring now to FIG. 8, it will be noted that under rather extreme moment loading in a counterclockwise direction, the outer or turret supporting bearing ring 22 tilts counterclockwise through the angle phi. This causes the contact angle alpha of the upper row of balls 35 to increase to a value such as 51° and the contact angle of the lower row of balls 36 to decrease to a value such as 22°. It will be readily recognised upon reflection that the diametrically related pair of balls 35, 36 on the opposite side of the bearing assembly will experience a similar but opposite nullyfying set of torque changes. In other words, the contact angle of a ball 36 on the opposite side of the bearing assembly will increase to approximately 51° whereas the contact angle of the overlying ball 35 will decrease to approximately 22°. Under the same verticle ring loading, torque losses decrease as the contact angle increases and vice versa. Greater changes in torque loss occur in the plane of the moment loading and decrease to a minimum in an axial plane at right angles to the moment plane.

Other important aspects of the invention bearing assembly involve important beneficial characteristics and the low torque losses achieved by using a conformity constant substantially higher than in conventional practice and preferably in the vicinity of 0.56 to 0.60. This high conformity constant reduces the interaction between the cage segments, and minimizes variations in friction losses and the associated variations in the rate of movement of both the balls and the race segments caused primarily by more severe moment loading of the bearing. These factors will now be explained by reference to FIGS. 7 and 8.

As previously explained, the bearing assembly is preloaded during assembly. Under normal static loading conditions the points of contact of the two rows of balls 35 and 36 with the pairs of raceways 28, 30 and 29, 31 are located along converging conical elements lying at a contact angle alpha of 35' to an associated diametric plane normal to the bearing axis.

Assuming now that a tank vehicle having its turret connected to the hull 13 by the invention bearing assembly is subjected to severe moment loading in a direction relative to the nose ring 21. This operating condition is shown in FIG. 8 and it will be noted that the contact angle alpha 1 for balls 35 has increased to 51° whereas the contact angle alpha 2 for balls 36 has decreased to 22°. The severe forces to which the vehicle is subjected, acting in concert with the movement of the turret relative to the hull, results in distortion of the hull, the turret and each of the nose and cup rings of the bearing assembly. These transitory, temporary conditions disturb the planicity of one or both bearing rings in one or more regions about their peripheries so that the raceway surfaces become undulating and non-circular. These distortions and undulations of the turret, hull and raceways, even though they may be small, adversely affect the movement of the balls and the associated cage segments 37. This will be readily apparent from a consideration of FIG. 7 from which it will be observed that the increase of the contact angle alpha from 35° to 51° reduces the radius of ball 35 relative to its points of contact with raceways 28 and 30. On the other hand the decrease of the contact angle from 35° to 22° for ball 36 increases the radius of ball 36 relative to raceways 29 and 31. In consequence, the travel speed of the balls and the cage segments differ in reverse fashion depending on which one of the rings is rotating faster. If the outer ring is rotating faster, the rate of ball propagation decreases as the contact angle increases; the reverse is true if the contact angle decreases. The reverse of the foregoing applies if the inner ring is rotating faster. It follows that the travel rates and distances of balls 35 and 36 and of their respective cage segments during one full revolution of the bearing ring are distinctly different. Moreover, these travel rates and distances differ in different portions of each row of balls. If any ball and/or cage segment is travelling at a different rate than other balls or cage segments, sliding necessarily occurs between contact areas with attendant frictional losses.

For these reasons, and in accordance with the principles of this invention, it is beneficial to provide each row of balls with a multiplicity of cage segments, each having a limited number of balls and normally having their adjacent ends spaced a short distance from one another. This permits the segments to move independently of adjacent segments thereby to minimize if not eliminate friction loss through interference of one segment with the movement of an adjacent one.

The spacing between the cage segments in each row at initial assembly might prove quite inadequate except for the fact that undulating portions of the raceways cause the balls to alternately slow down and to speed up and this change in travel rate is imparted to the cage segments. Moreover, this distortion and undulating condition may and usually does vary in degree along the path of ball travel. Accordingly, there exists along the race periphery a mixture of the geometry of FIGS. 7 and 8 with the condition in one figure blending into that represented in the other. For these reasons, some groups of balls together with the associated cage segments are increasing slightly in speed as others are receding from one another in the same row.

If follows from the foregoing analysis that the forced sliding of the balls and the additional friction losses resulting therefrom is minimized if not totally eliminated, a result achieved by adopting a conformity constant of approximately 0.56 to 0.60 for the raceways 28 to 31. A conformity constant of this magnitude very substantially reduces the contact angles below the angles corresponding to a conventional conformity constant of 0.52.

Another factor of importance achieved when using a conformity constant of approximately 0.56 to 0.60 is the fact that usually, but not necessarily, the load on an axially associated pair of balls 35 and 36 vary from one another in opposite directions in approximately equal values, the load on ball 35 increasing as that on ball 36 decreases, thereby maintaining the net friction torque variation substantially constant.

It is also to be understood that the travel speed of the balls differs in reverse fashion depending on which one of the bearing rings is rotating at a faster rate relative to the other. If the rate of relative rotation is higher for the outer ring, then the rate of ball propagation decreases as the contact angle increases; the reverse is true if the contact angle decreases. If the rate of relative rotation favors the inner ring then the ball propagation is the reverse of that stated above.

Still another important feature of the invention is the provision of criteria for assuring that two-ring bearing assemblies of different diameters will be equally proficient in supporting a stabilized platform in a manner accommodating both mounting and load-induced distortions. In such bearings, the bearing diameter measured diametrically of either row of balls is relatively large in comparison with the cross-sectional area of the two bearing rings. The diameter of a ball bearing assembly is well known to persons skilled in the anti-friction bearing art as the mean diametric distance between the centers of balls on the opposite sides of the assembly. It has been found that a double row bearing having converging contact angles of 35 degrees exhibits excellent operating characteristics and minimal torque losses if the ratio of the ball path diameter to the square root of the cross-sectional area of the bearing rings is at least 15 and exceeding 35 in the larger diameter sizes. As long as the ball size increases in proportion to the section height and width, this ratio is conveniently designated as the disconformity capability factor for two row stabilized platform bearings. This ratio is expressed as:

$$DC = d_m/\sqrt{A}$$

where $d_m$ is the diameter of the bearing ball path taken through the center of the two rows of balls in an axial plane to one side of fastener openings 23, 24 and A is the total cross-sectional area of the two bearing rings in the aforementioned axial plane, both measured in the same units.

A disconformity capability factor (DC) of 15 provides a relatively rigid non-flexible assembly whereas at higher values, the assembly becomes more flexible and more suitable for larger diameter applications. It is also important to relate the flexibility of the bearing assembly to the flexibility characteristics of the operating environment. In other words, the flexibility of the bearing assembly should be harmonized with that of the platform components between which it is assembled. This provides a stabilized platform wherein the principal components are fully compatible and respond harmoniously to load stresses.

Assembly of the components of bearing assembly 20 is carried out after providing several complete sets of balls including two sets of the same size and one or two sets of both larger and smaller sizes by one or two thousandths of an inch above and below the size which should provide a bearing assembly preloaded to a desired predetermined value.

The nose ring 21 is supported horizontally with the area outwardly of its raceways unobstructed and freely accessible from above and below. The outer ring 22 is lowered thereabout until its lower rim edge is generally opposite nose 27 of the inner ring. The outer ring is suitably supported in this position while one of the sets of balls of nominal size is assembled into the cavity between the upper raceways 28 and 30 along with the associated spacer segments or elements 37. When this operation has been completed, the assembler removes the supports for ring 22 and allows it to come to rest against the upper row of balls.

The second or lower row of balls 36 is then assembled through a charging port 50 opening radially through the lower raceway 31 of cup ring 22 as is best shown in FIGS. 3 and 4. This port is circular, substantially larger than balls 36 and is normally closed by a unitary plug having a cylindrical shank 51 and a mounting flange 52 provided with bores for mounting cap screws 53.

Port 50 being open, the operator inserts spacer elements 37 upwardly through the gap between the O.D. of ring 21 and the lower lip edge of ring 22 and supports it while inserting balls 36 into its openings 39, 40 via the charging port. Usually it is best to load several balls in this manner and cage ring segments 37 at widely spaced apart sectors of the bearing assembly thereby to determine whether balls of a selected size appear appropriate to provide a final assembly with all balls loaded to the desired preload value. If the first groups of balls charged into the lower row appear to be too small or too large, they are removed and balls of a different size from a second set are used for the charging operation. The assembler proceeds in this manner until the lower row of balls is in place, it sometimes being necessary to select still a third set or even a fourth set of ball sizes to achieve a final assembly preloaded to design specifications.

After the two rows of balls have been assembled, the balls and races are coated with lubricant and the seals 41 and 43 are installed.

While the particular high-performance low-torque anti-friction bearing assembly herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A heavy-duty anti-friction bearing assembly suitable for supporting a stabilized platform or the like with minimal torque losses under loads capable of causing distortion of said bearing assembly, including simultaneously occuring axial, radial and moment loads, comprising:
   a single forged alloy steel nose ring having an annular radial nose formed with arcuate raceways on the opposite lateral sides thereof;
   a single forged alloy steel cup ring concentric with said nose ring and formed with a pair of arcuate raceways converging toward a respective arcuate raceway on said nose ring and each of said arcuate raceways of said nose and cup rings having hardened surfaces;
   separate rows of balls mounted between an associated pair of raceways of said nose and cup rings including independently functioning spacer means in each of said rows of balls for maintaining adjacent balls spaced apart; and wherein
   the ratio of the diameter of said bearing assembly divided by the square root of the bearing assembly cross section having a value of at least 15.

2. An anti-friction bearing assembly as defined in claim 1 characterized in that each of said raceways extends over an arc of approximately 90 degrees and said balls and said raceways having a conformity constant of approximately 0.56 to 0.60.

3. An anti-friction bearing assembly as defined in claim 1 characterized in that said two rows of balls are held assembled between said nose and cup rings under a predetermined static preload.

4. An anti-friction bearing assembly as defined in claim 2 characterized in that the contact angle between each of said rows of balls and the associated pair of said raceways under static conditions is approximately 35 degrees.

5. An anti-friction bearing assembly as defined in claim 3 characterized in that under dynamic conditions, the contact angle between the balls in each row thereof and the associated pair of said raceways varies within a range of approximately 22 degrees to 51 degrees depending on operating conditions including simultaneously occuring axial, radial and moment loads acting to distort said bearing assembly.

6. A heavy duty anti-friction bearing assembly suitable for supporting a stabilized platform with minimal torque losses under loads capable of distorting said bearing assembly, including simultaneously occuring axial, radial and moment loads, comprising:
   first and second concentric rings;
   said first ring having an annular radial nose provided with an arcuate raceway on either lateral side thereof;
   said second ring having a pair of arcuate raceways facing toward a respective one of said raceways on the opposite sides of said nose;
   a row of balls separated by independent spacer means between a respective pair of the raceways of said first and second rings; and
   the ratio of the diameter of said bearing assembly and the square root of the cross sectional area of said first and second rings having a value of at least 15.

7. An anti-friction bearing assembly as defined in claim 6 characterized in that, under static conditions, the contact angle of said balls with their associated pair of raceways is about 35 degrees relative to a plane normal to the axis of said bearing assembly.

8. An anti-friction bearing assembly as defined in claim 7 characterized in that each of said raceways extends over an arc of about 90 degrees radially thereof.

9. An anti-friction bearing assembly as defined in claim 6 characterized in that said ball spacer means comprises cage ring means for each of said row of balls having holes each loosely accommodating a single one of said balls, and said cage ring means for each of said rows of balls being generally frusto-conically shaped and lying in converging surfaces of revolution.

10. An anti-friction bearing assembly as defined in claim 9 characterized in that said cage ring means comprises a plurality of arcuate strips each provided with a row of holes for a respective ball, and the holes at the opposite ends of said strips being slightly non-circular with the smaller diameter thereof lying transversely of said strip and the longer diameter thereof lying lengthwise of said strip.

11. An anti-friction bearing assembly as defined in claim 6 characterized in that said first and second rings are formed of forged alloy steel having the raceways thereof hardened to approximately RC 56–61.

12. An anti-friction bearing assembly as defined in claim 6 characterized in that each of said row of balls and the pair of said raceways associated therewith have a conformity constant of approximately 0.56 to 0.60.

13. An anti-friction bearing assembly as defined in claim 6 characterized in that the balls in each of said rows are preloaded under static conditions.

14. An anti-friction bearing assembly as defined in claim 6 characterized in that said second ring is provided with a ball charging passage opening through one of the raceways of said second ring.

* * * * *